P. WELIN.
PLAYER FOR MUSICAL INSTRUMENTS.
APPLICATION FILED JAN. 7, 1907. RENEWED FEB. 16, 1915.
1,134,249.
Patented Apr. 6, 1915.
7 SHEETS—SHEET 1.
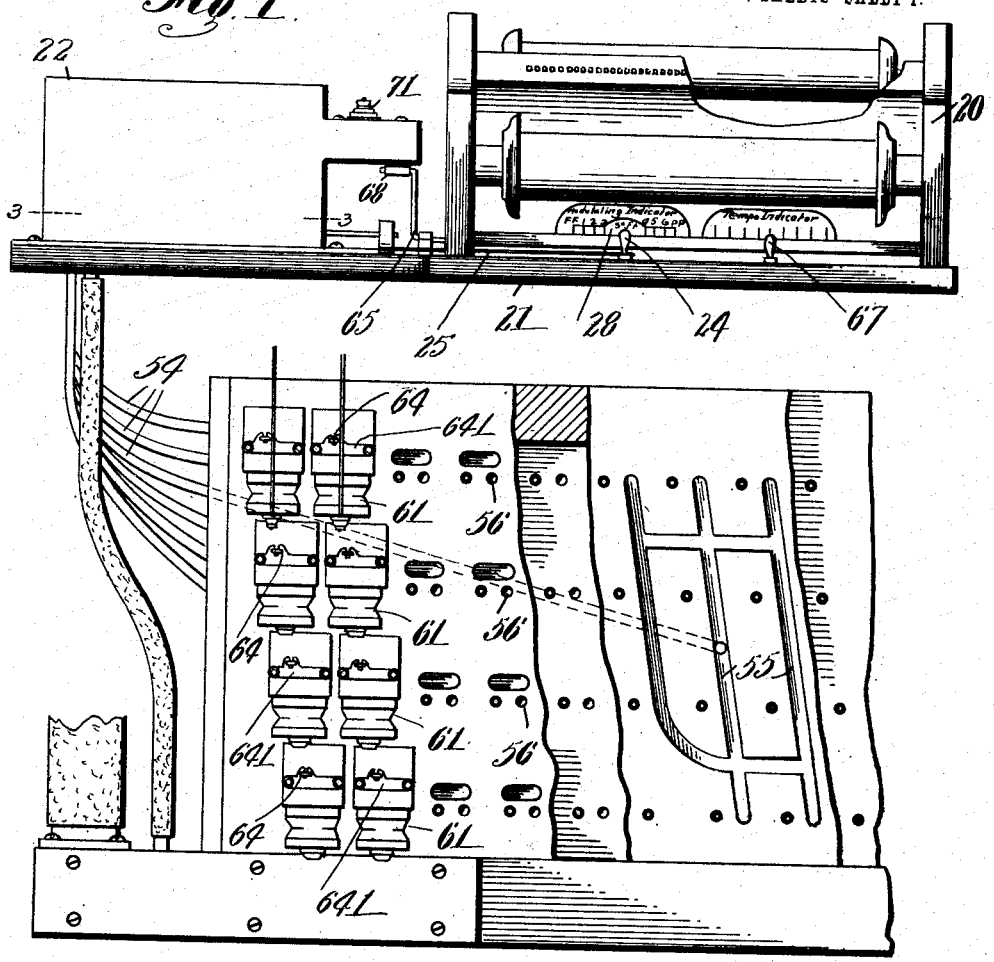
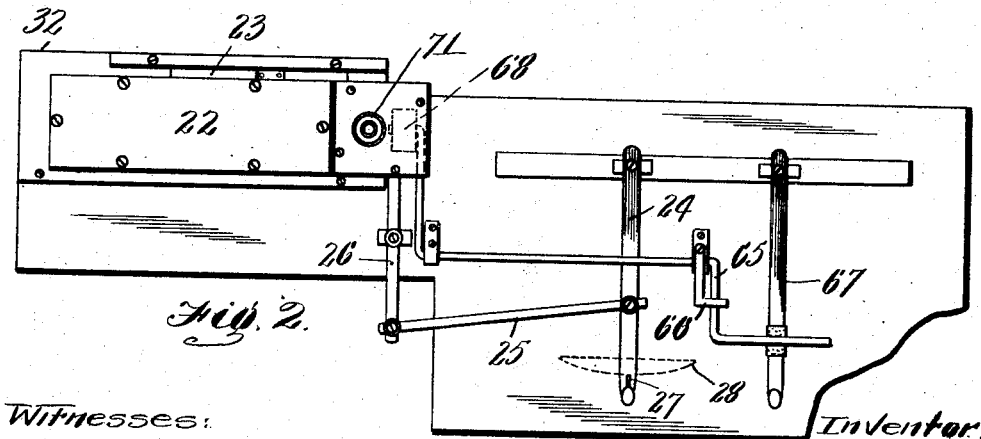

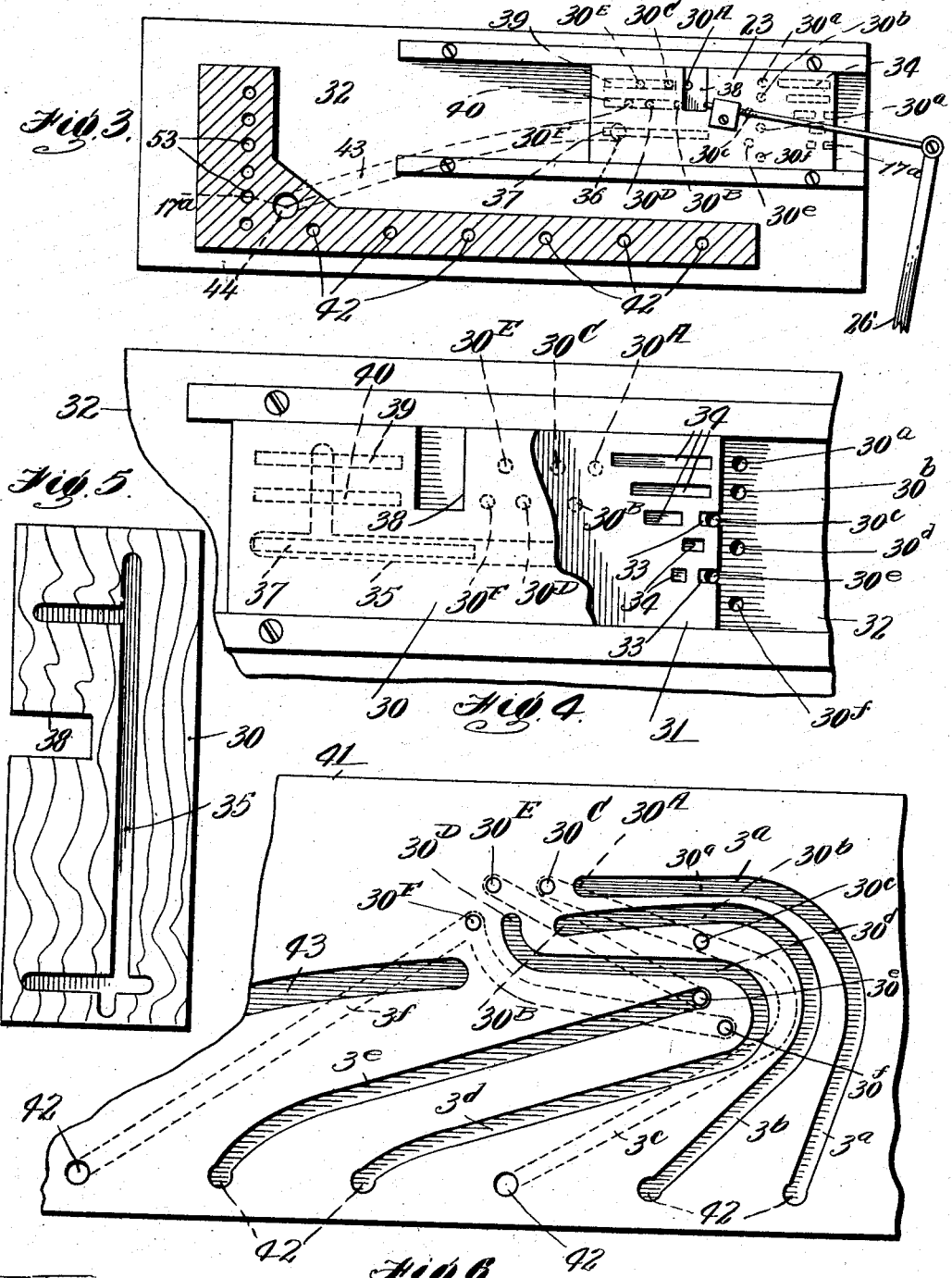

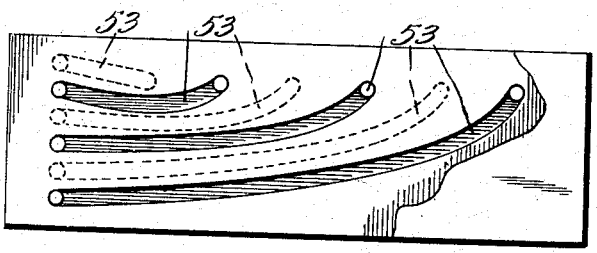
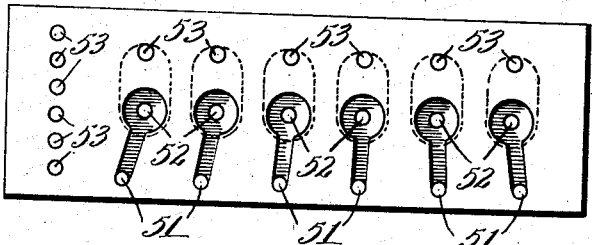
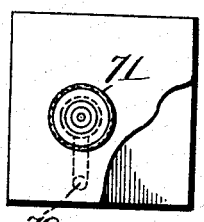
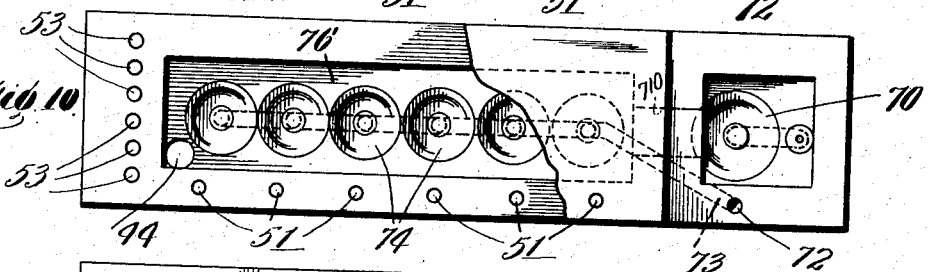
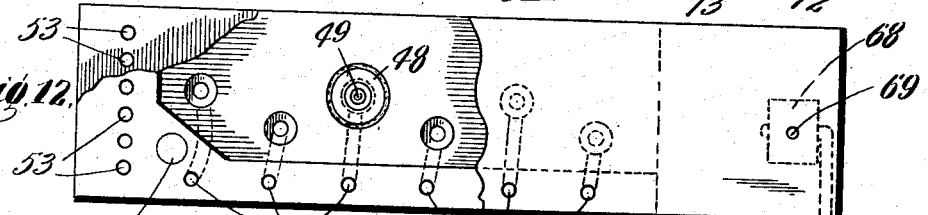
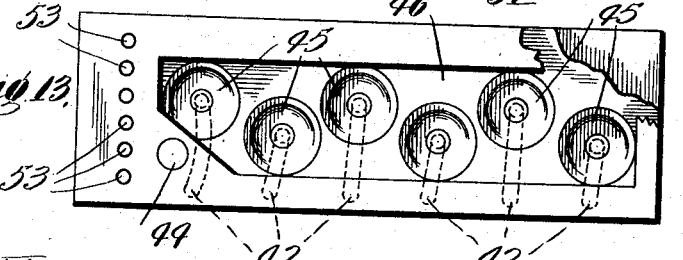

P. WELIN.
PLAYER FOR MUSICAL INSTRUMENTS.
APPLICATION FILED JAN. 7, 1907, RENEWED FEB. 16, 1915.
1,134,249.
Patented Apr. 6, 1915.
7 SHEETS—SHEET 4.
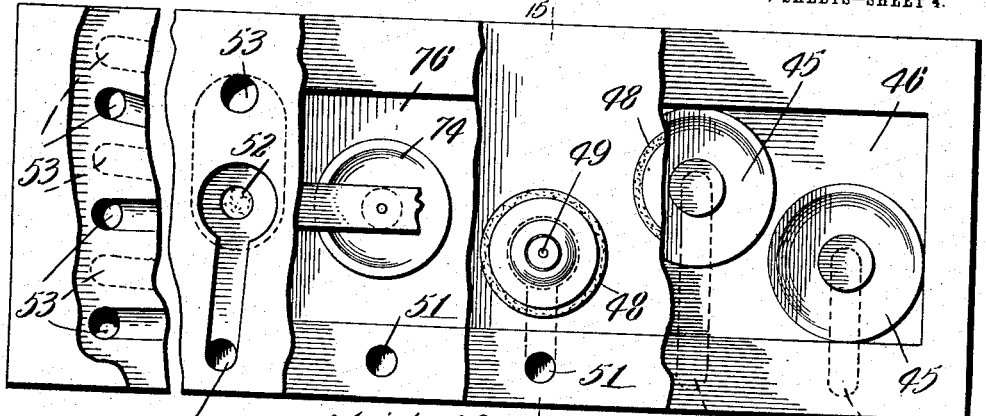
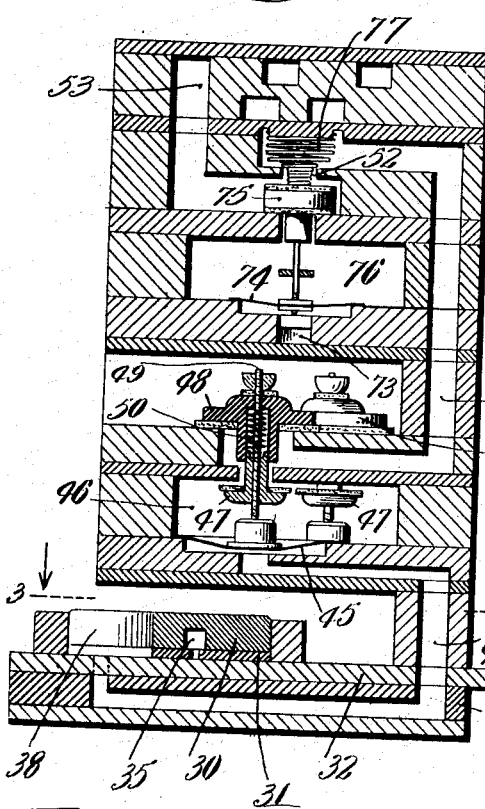
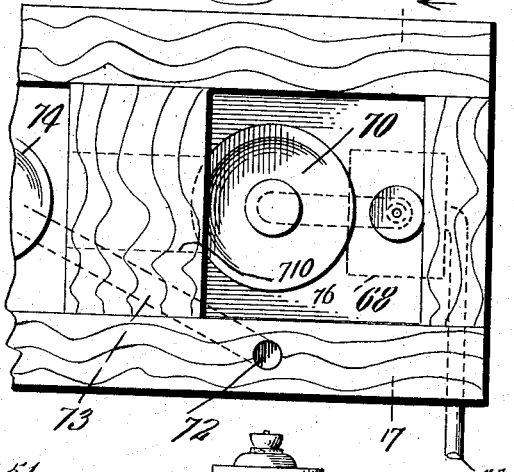
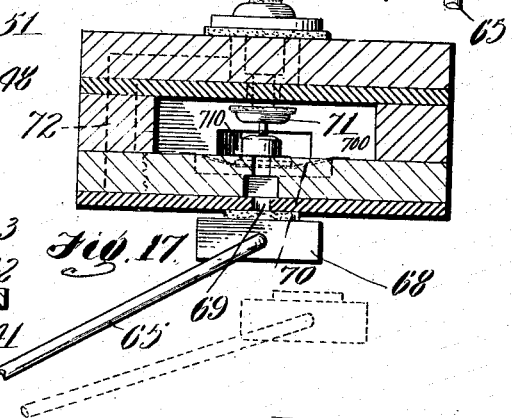
Inventor:
Peter Welin
by Attorneys
Southgate & Southgate

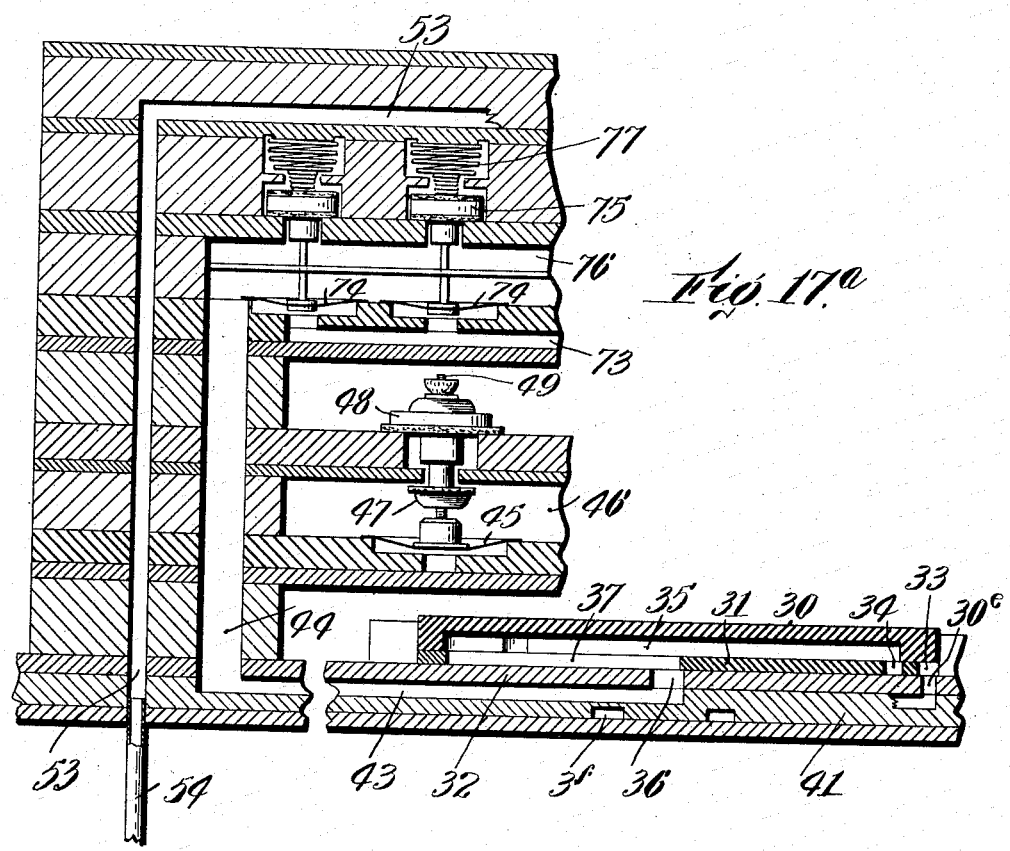

P. WELIN.
PLAYER FOR MUSICAL INSTRUMENTS.
APPLICATION FILED JAN. 7, 1907. RENEWED FEB. 16, 1915.

1,134,249.

Patented Apr. 6, 1915.
7 SHEETS—SHEET 6.

Witnesses
C. F. Wesson
M. E. Regan

Inventor:
Peter Welin
By Attorneys
Southgate & Southgate

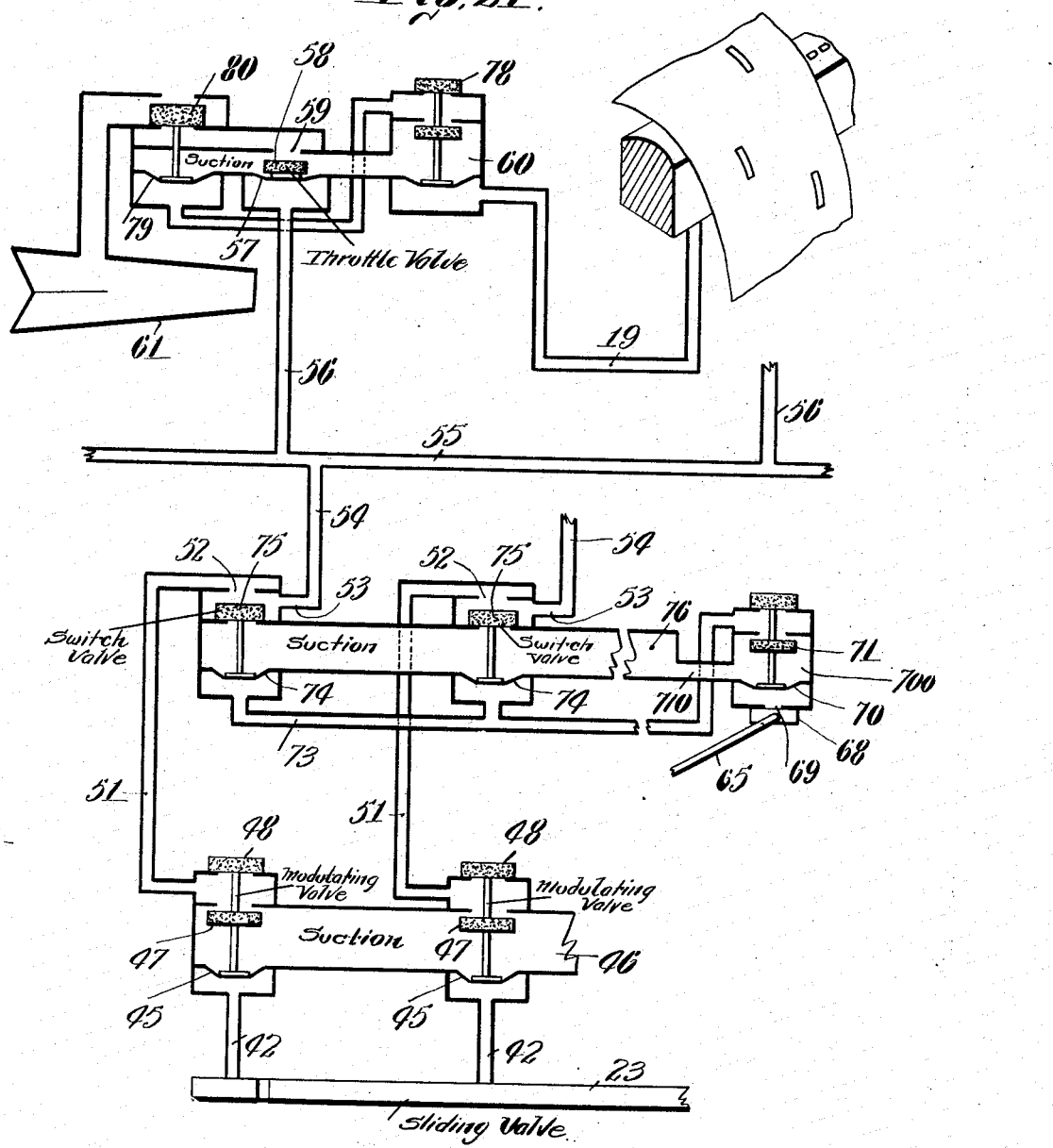

UNITED STATES PATENT OFFICE.

PETER WELIN, OF NEWCASTLE, INDIANA, ASSIGNOR, BY MESNE ASSIGNMENTS, TO LAWRENCE MAXWELL, OF CINCINNATI, OHIO.

PLAYER FOR MUSICAL INSTRUMENTS.

1,134,249.  Specification of Letters Patent.  Patented Apr. 6, 1915.

Application filed January 7, 1907, Serial No. 351,087. Renewed February 16, 1915. Serial No. 8,615.

*To all whom it may concern:*

Be it known that I, PETER WELIN, a citizen of the United States, residing at Newcastle, in the county of Henry and State of Indiana, have invented a new and useful Player for Musical Instruments, of which the following is a specification.

This invention relates to playing devices, which are preferably pneumatically controlled, for operating pianos and other musical instruments.

The principal objects of the invention are to provide separate playing devices of this character with improved modulating means which can be controlled manually if desired, in a most simple and convenient manner, preferably by the use of a slide valve and in connection with an indicator; to provide for operating such means to modulate or soften notes individually or by sections, as for instance, by octaves and when a plurality of notes are modulated simultaneously, to provide for setting a number of accenting means so that any one or more of such notes may be actuated as without interfering with the modulating action and for accomplishing this result in a simple, convenient and efficient manner; also to provide an improved throttling mechanism for instruments of this character; to provide means for adjusting the tension of the throttling valve spring; and generally to improve and simplify pneumatic actions for piano players and the like.

Figure 18:
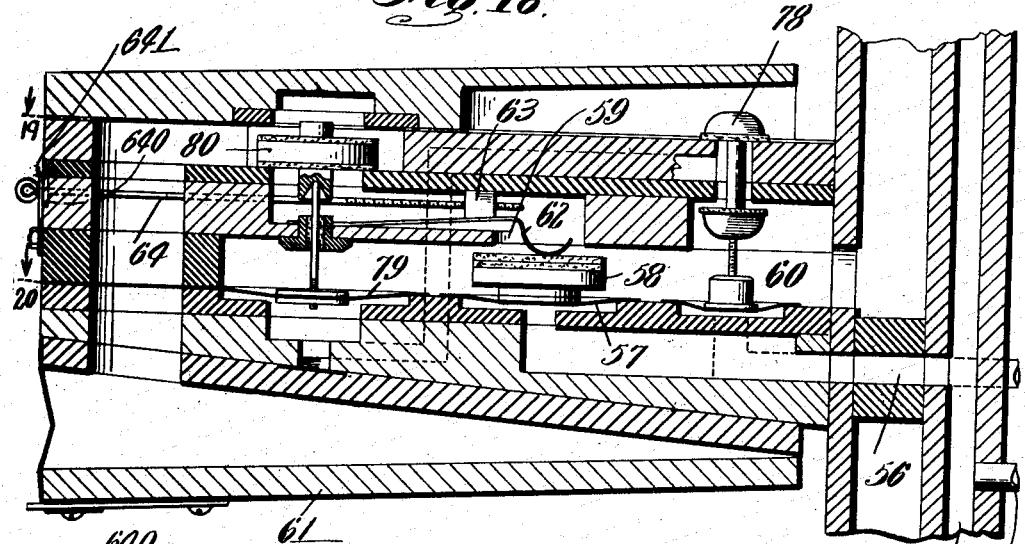
Figure 19:
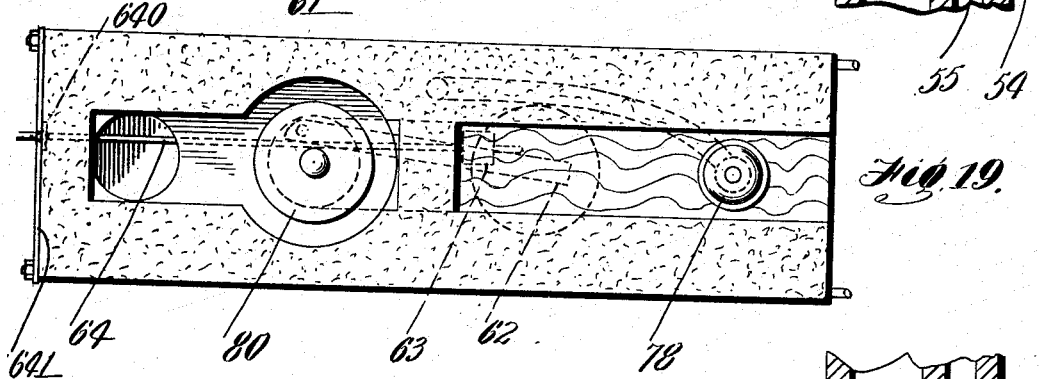
Figure 20:
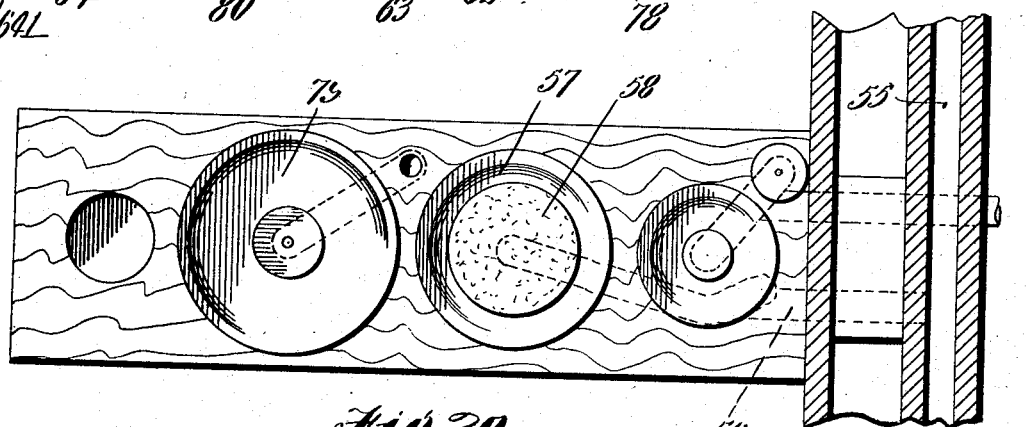

Reference is to be had to the accompanying drawings which illustrate a practical mode in which the above mentioned principles can be applied, and the invention carried out, and in which, Figure 1 is a front elevation of a portion of a piano player with parts broken away and showing the tracker bar, modulating valve box, and channel board. Fig. 2 is a plan of the modulating valve box, switch box and connections. Fig. 3 is a sectional view of the modulating valve box on the line 3—3 of Figs. 1 and 15, showing the slide valve for controlling the same in plan. Fig. 4 is a fragmentary view of the same on an enlarged scale with parts broken away to show interior construction. Fig. 5 is a bottom plan of the top plate of the slide valve. Fig. 6 is a plan view of a plate of the modulating valve box under the valve showing the channels thereof. Fig. 7 is a plan of a plate which constitutes the top of the channeled part of the modulating valve box. Fig. 8 is a side elevation of the next plate thereof. Fig. 9 is a plan of another of the plates. Fig. 10 is a plan of another of such plates showing a part of the switch box mounted thereon. Fig. 11 is a plan of a part of the switch box. Figs. 12 and 13 are plans of two of the plates which constitute parts of the modulating valve box. Fig. 14 is a plan of the valve box with the different plates broken away to show the same in different planes. Fig. 15 is a sectional view of the same on the line 15—15 of Fig. 14. Fig. 16 is a plan of the switch box on an enlarged scale with the top removed. Fig. 17 is a section on the line 17—17 of Fig. 16. Fig. 17ª is a sectional view on the line 17ª—17ª of Fig. 3. Fig. 18 is a longitudinal sectional view of one of the striking pneumatics with its valve box, and Figs. 19 and 20 are plans of two of the elements thereof, the parts above the lines 19 and 20, respectively, in Fig. 18, being removed, and Fig. 21 is a diagrammatic view showing the connections of the several parts.

In the form of the invention illustrated in the drawings, reference being had more especially to Fig. 21, the device is provided with a modulating valve box in which is a suction chamber 46 connected with a source of air tension. In this chamber are located a series of modulating pneumatics 45, one for each note or series of notes as desired; in the present instance, one of these pneumatics serves for the notes of an entire octave. These pneumatics are supplied as desired with atmospheric air through channels 42 individually controlled by a valve 23 which is manually operable to admit air to any one of the desired pneumatics. When air is admitted, it raises the pneumatic and operates a valve 47, 48, the raising of which admits atmospheric air to a series of passages 51 each of which communicates with a channel 53 leading to a pneumatic 57 for lifting a throttle valve 58 located in the suction chamber 60 of the valve box to throttle the passage 59 between this chamber and the corresponding striking pneumatic 61. In the construction specified, the passages to operate an entire octave are thus throttled simultaneously. The operation of the striking pneumatic is preferably controlled by the music sheet in the ordinary way through a channel 19 from the tracker. It is to be observed that the throttle valves of all the notes of an octave are simultaneously set so that when their striking pneumatics are connected with the suction chamber by the action of the usual mechanism, the air passage will be throttled to soften or modulate the tone. If, while this state of affairs continues, it is desired to accent the notes while those of that octave are sounded, a lever 65 is provided which is manipulated to operate a switch valve 75 in each of the passages 53 leading to a throttle valve pneumatic 57 and open it to establish communication between a suction chamber 76 and all of the throttling valve pneumatics, thus preventing the softening action while this lever is operated, although the position of the modulating valves 47, 48 and their pneumatics is not interfered with in any way.

It will be seen that so far as this diagrammatic figure goes, it is similar in some respects to the corresponding figure shown in my co-pending application for patent on "Pneumatic action for musical instruments," Serial No. 351,085, filed January 7, 1907, the chief difference in principle in the upper half of the figure, being the location of pneumatic 79 for a purpose which will be hereinafter described, while in the lower half, the switch valves, switch box, modulating valve, and slide valve perform similar functions but are differently located, arranged and combined chiefly to simplify and adapt the invention for a piano player, although the same arrangement may be applied to combination pianos.

Referring specifically first to Figs. 1 and 2, it will be seen that a construction is illustrated in which the tracker-box 20 is mounted on a ledge or plate 21 and adjacent thereto is mounted a modulating valve box 22. The operation of the modulating valve box is controlled by a sliding valve 23 shown in Fig. 3. This valve is operated through a lever 24 connected by a link 25 with a lever 26 mounted to swing on a rock shaft or the like. The lever 24 is provided with a pointer 27 which moves over a scale 28 preferably located on the tracker box so as to indicate the position of the sliding valve and the number of notes or octaves which are modulated. It is to be understood that the device can be constructed so that any desired number of notes can be simultaneously softened or modulated. In the present instance it is shown as of such construction that the notes of an entire octave are softened simultaneously and the scale is accordingly divided. The sliding valve 23 is also shown in my above identified application and is claimed therein in combination with other elements but is specifically claimed in this case, and may be constructed in many ways and the position of the openings in the plate of the modulating valve box which communicate with the perforation therein will, of course, modify the construction of the valve. If the valve swings instead of having a sliding motion, the relative positions of the parts of the valve and the perforations in the valve box will be correspondingly changed. This valve, however, is shown as having a straight sliding motion and as consisting of two plates; an imperforate top plate 30 and a perforated lower plate 31. The modulating valve box is also provided with a plate 32 in which are two series of openings or passages, there being six in each series in the present case as there are six octaves with which they connect.

If the player is constructed to soften a different number of notes simultaneously, or if it has a different number of notes, the number of passages will be correspondingly changed. The passages of one series are designated as $30^a$, $30^b$, $30^c$, $30^d$, $30^e$ and $30^f$ and those of the second series are designated $30^A$, $30^B$, $30^C$, $30^D$, $30^E$ and $30^F$. Each of the modulating pneumatics in the valve box is connected with one of the passages in each series. The passages of the first series are so located that on the travel of the valve past a certain point, they will all either be covered or exposed simultaneously. Therefore, if the valve has a straight sliding motion as shown and a straight end, they will be located in a straight line. They are shown in substantially this manner but as they are located in two lines, the valve 23 is shown as being provided with notches 33 for admitting air to those in the rear row at the same time that air is admitted to those in the other row, the positions of the passages and shape of the end of the valve being mutually dependent upon each other and on the kind of motion imparted to the valve. When the valve is in the position shown in Fig. 4 all of the passages $30^a$, $30^b$, etc. are exposed to the air. If the valve now moves to the right, the passages will first be closed by the valve and on further movement thereof in the same direction, the passages $30^a$, $30^b$, $30^c$, $30^d$, and $30^e$ will be bled by being located under a series of perforations 34 in the bottom plate of the valve. These perforations 34 are preferably of different lengths to provide for keeping them in communication with the several passages of the plate 32 different periods of time and they all communicate with a channel or passage 35 in the under side of the top plate 30. This channel also communicates with another perforation 36 in the plate 32 which, throughout the travel of the valve, is located over a passage 37 in the plate 32 which communicates with the suction chamber of the modulating valve box so as to bleed the pneumatics when the valve is in the proper position. In the position just described, all the pneumatics except one are placed in communication with the passage 37 so as to be restored to their normal condition ready for further operation. The reason the passage 30$^f$ is not bled at this time is because a notch 38 in the valve now comes into registration with the passage 30$^F$ which is connected with the same pneumatic as the passage 30$^f$. Consequently, the pneumatic connected with these two passages is opened to the air and that octave is modulated as will be explained. In the form shown, the passages of the second series are mounted in two parallel lines which are in the line of motion of two perforations 39 and 40 in the plate 31. These passages communicate with the passage 35 whereby all the pneumatics can be bled in an obvious manner. The entrance of air from the two series of passages 30$^a$, 30$^A$, etc. will now be traced.

Fig. 6 shows a plate 41 containing continuations of the two series of passages in the plate 32, these continuations being given the same reference characters as in the other plate. A series of channels is provided either in the top or bottom of the plate 41 for connecting the passages of these two series; for example, a channel 3$^a$ connects the passages 30$^a$ and 30$^A$. Channels 3$^b$, 3$^c$, 3$^d$, 3$^e$ and 3$^f$ are also provided for connecting the other passages in a similar manner. Some of these channels are located entirely on one side of the plate while others are located partly on one side and partly on the other, the two parts being connected by a perforation. Each of these channels is also so formed as to communicate with one of a series of six channels 42. It will be seen, therefore, that through the series of channels 3$^a$, etc. which are connected with the six pneumatics in the modulating valve box, all of the passages of the two sets in the plate 32 are put into communication with their respective pneumatics. The passage 37 is located directly over, and terminates in, a suction channel 43 in the plate 41 which communicates with a perforation 44 (Fig. 3). This perforation 44 is put into communication with the suction chamber of the modulating valve box in a manner that will be described. This valve box operates on a principle similar to that disclosed in my above identified application but differs therefrom in many features of construction, whereby it is rendered more compact and simple. It is also adapted especially for piano players by these changes, although capable of general use. As it is broadly claimed in said companion case, the principle of it is not broadly claimed herein but it is claimed with special reference to the improvements thereover. It will be observed, however, that the valve 23 is located below the main part of the modulating valve box so that it is protected from injury by the overhanging portion thereof and sheltered from the accumulation of dust.

Referring to Figs. 14 and 15 it will be seen that the valve box is made up of a series of plates and that each of the channels 42 communicates with a modulating valve pneumatic 45 in the suction chamber 46 of the valve box. The admission of air through one of these channels to the pneumatic lifts the valve with which the pneumatic is connected. This valve may be of any desired character but it is shown in the form of a differential valve having two parts 47 and 48; the part 47 is mounted rigidly on valve stem 49 while the part 48 is slidably mounted thereon and a spring 50 normally holds these two parts away from each other; consequently, when the valve stem is forced up by the pneumatic, the part 47 will first move to its seat and then the spring will force the part 48 from its seat. This will cut off a channel 51 from communication with the suction chamber and later will connect it with the outside air. This channel communicates through a passage 52 and channel 53 with a pipe 54 (Fig. 1) which enters a modulating channel 55 in the channel board. This communicates through passages 56 with a series of pneumatics 57. Each of these pneumatics operates a throttle valve 58 to throttle a passage 59 between a suction chamber 60 and striking pneumatic 61 as shown in Fig. 18. The throttle valve is shown as normally pressed away from its seat by a spring 62, the tension of which is adjusted by a block 63 operated by a screw 64. The screw is held in adjusted positions by a nut 640 which in turn is secured by a clamping plate 641 held by the bolts which secure the valve-boxes in position.

If, while the throttle valve corresponding to one octave or other set of notes is in position for softening those notes it is desired to accent the notes as played, the switch valves are operated.

A lever 65 is pressed by a spring 66 against one of the controlling levers, as for example, the tempo lever 67. This lever is intended normally to swing on a vertical pivot but its end can be raised so as to move the end of the lever 65 upwardly and depress the opposite end thereof. The result of this is to move a valve 68 shown in Fig. 17, away from its seat and admit air through an opening 69 to a pneumatic 70 which forms a wall of a chamber 700 with which the switch box is provided and which communicates through a passage 710 with the suction chamber 76. This moves upwardly a valve 71 and cuts a passage 72 off from communication with suction connecting it with the outside air which passes through a channel 73 to a series of switch valve pneumatics 74. This simultaneously raises switch valves 75 to close all of the passages 52 and connect the passages 53 with the suction chamber 76, although the pneumatics 74 if desired may be located in the suction chamber 46. This operation restores the throttle valves during the time that this lever 65 is operated and permits the notes to be sounded in their ordinary manner without throttling; then when this lever is permitted to move back to its normal position, the throttling effect of the rest of the notes will continue.

A spring 77 is employed to assist in forcing each valve 75 back to its seat. It will be understood, of course, that the primary valves 78 for controlling the operations of the secondary valve pneumatics 79 are operated from the tracker bar, being controlled by the perforated sheet music in the usual way.

The pneumatics 79 control a valve 80 which controls the communication of the striking pneumatics 61 with the suction chamber and with the outside air. It will be seen from this that a construction is provided which can be applied to a piano player or the like in a very simple and convenient manner for efficiently performing the results above specified.

The differential valve 47—48 and the adjustment of the throttle valve by the screw, block, and spring are not specifically claimed herein as they form the subjects of claims in my co-pending applications on "Automatic modulating mechanism for musical instruments," filed January 7, 1907, Serial No. 351,086; "Valve for pneumatically controlled musical instruments", filed January 7, 1907, Serial No. 351,089; and "Differential valve for pneumatically controlled musical instruments", filed July 18, 1907, Serial No. 384,361.

While I have illustrated and described a particular embodiment of my invention, I am aware that many modifications may be made therein by any person skilled in the art within the scope of the claims. Therefore, I do not wish to be limited to the particular construction shown, but What I do claim and desire to secure by Letters Patent is:—

1. In a music playing device, the combination of striking pneumatics, a valve box, means including modulating valves in said valve-box for modulating the striking effect of a portion of said striking pneumatics, means including switch valves for neutralizing the effect of said modulating valves, and a switch box mounted on the valve box and having means for controlling said switch box.

2. In a music playing device, the combination of a valve box, valves therein, pneumatics for said valves, passages controlled by said valves, a switch valve in said box for additionally controlling said passages, pneumatics for operating said switch valves, and a switch box mounted on the valve-box and having passages connected with the switch valve pneumatics for controlling them, and having means for controlling the last named passages.

3. In a music playing device, the combination of a valve box, a series of throttle valves, modulating valves in said valve box, switch valves in said valve box, both the modulating valves and the switch valves having connections for controlling said throttle valves, and a switch box mounted on the valve box and having means for controlling said switch valves independently of the operation of said modulating valves.

4. In a piano player, the combination of a modulating valve box having a suction chamber, throttle valves, pneumatics for said throttle valves, channels connecting said pneumatics with said suction chamber, means for controlling the connection of said channels with the suction chamber and with the outside air, a second suction chamber, a switch valve for connecting the throttle valve pneumatics with the second suction chamber independently of the position of said controlling means, a pneumatic in said second suction chamber for operating the switch valve, and a switch box mounted on said valve box for operating said switch valve pneumatic, said switch box having means for normally preventing the admission of air thereto and for permitting the connection of the switch box with the suction chamber at the same time.

5. The combination of a modulating valve box having two suction chambers, a channel with which both of said chambers can communicate, a switch valve for controlling the connection of said channel with one of said chambers, a pneumatic for said switch valve in the last named chamber, a switch box on the valve box having means for controlling the admission of air to said pneumatic, a modulating valve for controlling the connection of said channel with the other of said suction chambers, a pneumatic in the last named suction chamber for operating said modulating valve, and a sliding valve below both of said suction chambers for controlling the admission of air to the last named pneumatic.

6. In a music playing device, the combination of throttle valves, a modulating valve box having two suction chambers, a plurality of series of throttle valve pneumatics normally connected therewith, a modulating valve for each of said series to control the connection of the throttle valve pneumatics thereof with one of the suction chambers and with the outside air, a pneumatic in said suction chamber for each of said modulating valves, a switch valve for each of said series of throttle valve pneumatics, and pneumatics in the second suction chamber for operating all of said switch valves to connect all of the throttle valve pneumatics with the second suction chamber independently of the position of the modulating valves.

7. In a music playing device, the combination of a suction chamber, a pneumatic therein, a valve operable by said pneumatic, an air passage from said valve to a valve box, the connection of said passage with the suction chamber and with atmospheric air being under the control of said valve, a second suction chamber, a pneumatic in the second suction chamber, and a switch valve controlled by the last named pneumatic for connecting said passage with the second suction chamber and simultaneously disconnecting the passage from the outside air or the first suction chamber independently of the condition or position of the first named valve.

8. In a valve box, the combination of a suction chamber, valves, pneumatics in the suction chamber for operating said valves, a horizontal plate located below the suction chamber, and spaced therefrom, said valve box and plate having passages leading from the top of said plate to each of said pneumatics, and a valve on the top of said plate between it and the remainder of the valve box and accessible from the outside.

9. A valve box for a piano player, having a suction chamber, valves, a series of pneumatics for said valves, a passage communicating with each pneumatic, a plate below said pneumatics, said chamber overhanging the plate, said plate having a series of perforations, one connected with each of said passages, and a moving valve having a notch for uncovering certain of said perforations when the valve is moved.

10. In a piano player, the combination of a series of pneumatics having passages connected therewith, a plate below said pneumatics having two series of perforations, each of said passages being connected with one perforation of each series, and a sliding valve having a notch for uncovering the passages of one series in succession as it moves and adapted to uncover all those of the other when its end is moved beyond a certain point.

11. The combination of a plate having channels therein, and a valve movable on the plate and having a passage for connecting certain of said channels when the valve is in one position and other of said channels when in another position, and having bleeding passages in position to register with said channels in the plate after the valve moves beyond the position for so connecting them.

12. As an article of manufacture, a sliding valve having a conducting passage and provided with a plurality of bleeding passages arranged parallel with the direction of motion of the valve and all communicating with said conducting passage, and having a notch in one side open to the air at the side, and open on the side of the valve on which the bleeding passages are located.

13. A switch box for music playing devices, comprising a suction chamber, a connection from another part of the box, a pneumatic with which said connection communicates, a valve, a pneumatic in the box for operating said valve, an opening in the bottom of the box, a second valve adapted to close said opening for controlling the admission of air to said last named pneumatic, means for normally raising the second valve to close it and prevent the admission of outside air, and means for forcing the second valve from its seat.

In testimony whereof I have hereunto set my hand, in the presence of two subscribing witnesses.

PETER WELIN.

Witnesses:
ALMA E. YAGER,
EDWIN B. GLAU.

Copies of this patent may be obtained for five cents each, by addressing the "Commissioner of Patents, Washington, D. C."